2,886,412

PROCESS OF SPRAY DRYING A SOLUTION OF A MONOPERSULFATE AND A BORON COMPOUND

Donald B. Lake, Grand Island, and Stephen E. Stephanou, Lewiston, N.Y., assignors to E. I. du Pont de Nemours and Company, Wilmington, Del., a corporation of Delaware No Drawing. Application January 31, 1956
Serial No. 562,599

5 Claims. (Cl. 23—114)

This invention relates to improvements in the manufacture of solid alkali metal monopersulfates. It relates, more particularly, to an improved method of recovering solid alkali metal monopersulfates from aqueous solution.

The acid salts of monopersulfuric or Caro's acid, $H_2SO_5$, have been known for many years. They are readily prepared by the partial neutralization of the acid with a carbonate or hydroxide, usually that of an alkali metal, followed by recovery of the solid by evaporation of the water. It may be noted that both hydrogen ions in the acid cannot be replaced by neutralization, attempts at such replacement merely leading to decomposition of the monopersulfate ion.

The acid salts are unstable at high temperatures and the evaporation of water therefrom as accomplished heretofore is a tedious process which may require between several hours and several weeks. Such a process is obviously unacceptable commercially. The solids finally recovered are, moreover, in the form of hard crusts or agglomerates which must be pulverized before use or further processing.

An object of this invention is, consequently, to provide an improved method for the recovery of alkali metal and ammonium monopersulfates from their aqueous solutions.

Another and particular object is provision of a commercially acceptable method for recovering sodium monopersulfate from aqueous solution.

A further object is provision of a method for recovering sodium monopersulfate from aqueous solution in a finely-divided condition.

The above-mentioned and yet further objects are are achieved in accordance with this invention by a process in which certain chemicals are added to the monopersulfates, in clear solution or in a slurry, and the resulting mixture is passed through a spray drier.

The chemicals added to the monopersulfate in the spray-drying procedure are inorganic compounds of boron such as borax, boric acid and boric anhydride. The quantity of boron compound utilized will depend to some extent on the particular monopersulfate salt that is being dried but in general a weight of about 1–10%, based on the total weight of the slurry or solution, suffices. Additional improvements can sometimes be obtained by addition to the mixture of a commercial wetting agent such as the alkyl aryl sulfonate of an alkali metal. The improvement given by the wetting agent is, however, slight, and employment of the material is purely optional.

The behavior of a monopersulfate in spray drying is partially determined by the cation present. Potassium or ammonium monopersulfate solutions or slurries may be spray dried directly with about 90% recovery of the active oxygen. Some of the product, however, generally adheres to the walls of the spray drier. In the mildest cases, this behavior results in decomposition of the product with loss of active oxygen. In extreme cases, the drier is completely clogged. When boron compounds comprising between about 1 and 2% by weight of solution or slurry are added to the solution, substantially 100% of the active oxygen can be recovered. Higher percentages of additive can be used but are unnecessary.

The behavior of sodium monopersulfate is quite different, solutions of this compound cannot be spray-dried without the help of an adjuvant. The sodium salt always clogs the drier with consequent loss of all active oxygen. The boron additives mentioned above are, however, quite effective in passing this salt through the drier.

The quantity of additives needed with sodium monopersulfate is somewhat larger than that added to the potassium or ammonium salt. A weight of additive comprising between about 1 and 10% by weight of the solution or slurry should be utilized with 5–10% preferred. Since the quantity of boron additive can be varied not only with a particular monopersulfate but also with the different salts, it may properly and broadly be referred to in all cases as "an amount effective to pass the salt through a spray drier."

The weight of adjuvant employed is calculated from the total weight of the slurry or solution dried and may perhaps be understood from a consideration of the methods of preparing the compound. As noted above, the monopersulfates are generally formed by partially neutralizing a solution of monopersulfuric acid containing sulfuric acid. Sulfates and bisulfates are consequently produced simultaneously with the monopersulfates. The sulfates and bisulfates partially precipitate from the solution yielding a slurry which may then be spray dried after the process of this invention. This slurry is the one referred to above. Alternatively, the slurry may be filtered to yield the clear solution also mentioned above. The solution yields a product higher in active oxygen content than the slurry does but, since the sulfate and bisulfate impurities may be desirable, they are usually retained. While the monopersulfate samples dried by the instant process may be referred to generically as "solutions," it will be understood that solid precipitate may also be present.

As noted, a hydrocarbon sulfonate wetting agent may optionally be employed, particularly with sodium monopersulfate. Preferred sulfonates are the aryl alkyl sodium or potassium salts containing a 12 carbon chain attached to a sulfonated benzene nucleus. The chain may, however, consist of 3–15 carbons and the nucleus may be either benzene or toluene. About 0.5–1% of the sulfonate is preferred, the weight again calculated from the total weight of solution or slurry. These agents may also be used with potassium and ammonium monopersulfates with some improvement in results.

The type of spray drier used in the practice of the invention is immaterial. A rotating disk spray drier was employed in the illustrations given below but other driers, employing for example the principle of atomizing the solution to be dried, are perfectly satisfactory. In all cases the product has the advantage that its bulk density is less than the bulk density of a solid monopersulfate obtained in any other manner, e.g. by pulverizing solid crusts. Low bulk density is especially important in one major utility of the solids, bleaching. It enables the salts to be mixed with solid detergents, themselves of low density, without the danger of settling or separation under the influence of gravity.

The spray-drying adjuvants of this invention have been discussed primarily with reference to solutions of the monopersulfates of the alkali metals. They can be used with other monopersulfates as well, that of calcium for example. Of the alkali metal and ammonium salts, those of sodium, potassium and ammonium are the most important and represent preferred embodiments of the invention.

There follow some examples which illustrate the practice of the invention. All percentages in the examples are weight percentages.

EXAMPLES

A series of slurries containing dissolved sodium monopersulfate was fed into a conventional rotating-disk, spray-drying apparatus. Inside such apparatus the liquid mixture strikes a rapidly rotating disk which disperses the feed into a fine spray or mist. The dispersion is then completely dried by an incoming stream of hot air. The product falls to the floor of the drier and is carried into a collector whence it is removed.

The results obtained from the runs are reported in the table. In some cases, inert diluents such as phosphates or neutral sulfates were included in the solution, or slurry with no effect on the drying properties. In all cases the inlet temperature was about 600°–640° F. and the outlet temperature was about 140°–150° F. Pressures were ambient. The disk was rotated at a speed of about 30,000–50,000 r.p.m.

The wetting agent optionally employed in some runs was a commercial agent believed to be the sodium salt of an acid consisting of a 12 carbon alkyl chain attached to a sulfonated benzene nucleus. The active oxygen content reported in the product is uncorrected for moisture present, e.g. 5–6%.

Having described our invention, we claim:

1. In the process of spray drying a solution of a monopersulfate of the group consisting of the alkali metal and ammonium monopersulfates, the step comprising supplying to said solution about 1–10% by weight of a boron compound of the group consisting of boric acid, boric anhydride and borax.

2. The process of claim 1 employing a solution of potassium monopersulfate.

3. The process of claim 2 in which about 1–2% by weight of the boron compound is supplied to the solution.

4. The process of claim 1 employing a solution of sodium monopersulfate.

5. The process of claim 4 in which about 5–10% by weight of the boron compound is supplied to the solution.

References Cited in the file of this patent

UNITED STATES PATENTS 2,119,970    Smith                 June 7, 1938

OTHER REFERENCES

Mellor: "Treatise on Inorganic and Theoretical Chemistry," vol. 10, pages 482–483 (1930).

*Table I*

SPRAY DRYING OF AQUEOUS MONOPERSULFATE SOLUTIONS

| Run | Feed Rate, Ml./Min. | Feed Composition (Percent) | Product Active Oxygen Recovery (Percent) | Remarks |
|---|---|---|---|---|
| 1 | 70 | 15.1 $NaHSO_5$<br>11.5 $Na_2SO_4$<br>2.9 Borax<br>1.5 $B_2O_3$<br>0.4 Wetting agent | 90 | Most of product in collector. |
| 2 | 75 | 18.0 $NaHSO_5$<br>12.0 $Na_2SO_4$<br>2.7 Borax<br>1.5 $B_2O_3$<br>0.4 Wetting agent | 88 | More than half of product in collector. |
| 3 | 50 | 18.4 $NaHSO_5$<br>17.2 $Na_2SO_4$<br>2.9 Borax<br>1.9 $H_3BO_3$ | 86 | Do. |
| 4 | 70 | 15.0 $NaHSO_5$<br>10.3 $Na_2SO_4$<br>2.7 Borax<br>2.7 $Na_2HPO_4$<br>1.6 $H_3BO_3$<br>1.4 $B_2O_3$<br>0.4 Wetting agent | 90 | All of product in collector. |